United States Patent Office 3,658,939
Patented Apr. 25, 1972

3,658,939
POLYURETHANE AND ADHESIVE SOLUTION OF A POLYURETHANE
Austin T. Carpenter, Roy Garrington, and Keith W. Harrison, Leicester, England, assignors to USM Corporation, Boston, Mass.
No Drawing. Filed Sept. 26, 1969, Ser. No. 862,063
Claims priority, application Great Britain, Dec. 11, 1968, 58,777/68
Int. Cl. C08g 41/04, 22/00
U.S. Cl. 260—858
14 Claims

ABSTRACT OF THE DISCLOSURE

Polyurethane and adhesive solution of polyurethane providing superior bond strength to metallic surfaces. The polyurethane is formed by chemical reaction between components comprising an hydroxyl terminated polyol, an organic polyisocyanate and a chain extending agent which includes an organic diol having as a substituent a carboxyl group or a grouping capable of conversion to a carboxyl group.

---

This invention is concerned with improvements in or relating to adhesive compositions.

It is a practice at the present time to employ adhesive compositions comprising polyurethane materials for bonding various substrates. Polyurethane materials suitable for various applications may be made by bringing about chemical reaction between a polyol, which may be, for example, hydroxyl terminated linear polyester or hydroxyl terminated polyether glycol, organic diisocyanate and chain extending agent, which may be, for example, a short chain aliphatic diol or diamine. Adhesive compositions comprising polyurethane materials are particularly useful for forming bonds to some materials, for example, polyvinyl chloride substrates, but normally do not form strong, long lasting bonds to various other materials, for example, metallic substrates.

It is an object of this invention to provide a polyurethane material which can be used to provide a composition capable of forming strong bonds to a variety of materials, for example, to metals.

It is another object of this invention to provide an improved adhesive composition.

We have now found that adhesive compositions comprising novel polyurethane materials formed from polyol, an organic polyisocyanate material and a particular type of diol as at least a part of the chain extending agent can be used to form strong bonds to metallic substrates. The particular type of material used as the chain extending agent is an organic diol material having as a substituent a carboxyl group or a grouping capable of conversion to a carboxyl group, the hydroxyl groups of the diol having greater susceptibility than the substituent for reaction with available isocyanate groups of the isocyanate material.

The organic diol forming at least part of the chain extending agent used in forming the new polyurethane material is a substituted short chain linear preferably saturated aliphatic diol material having a carboxyl or carboxyl forming substituent and having a carbon to carbon chain of from 3 to 7 carbon atoms. The term "carboxyl forming substituent" refers primarily to masked carboxyls, for example, simple ester groups which protect the carboxyl group during the urethane forming reaction and from which the alcohol residue can be split off to regenerate the acid, i.e. carboxyl group. In addition to the carboxyl or carboxyl-forming group, the carbon to carbon chain may have further substituent groups such as lower alkyl groups which do not interfere with the urethane forming reaction. For example, useful diols include those having the formula

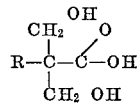

where R is a methyl or ethyl group. One particularly suitable organic material is dimethylol propionic acid. The chain extending agent may consist solely of a single one of these organic diol materials or may be a mixture of such organic diol materials or a mixture of one or more of such diols together with one or more other materials, such as short chain diols free from other reactive groups, and known to be suitable for use as chain extending agents, for example, 1,4-butane diol.

The polyol and organic polyisocyanate material may be chosen with a view to imparting desired properties to the polyurethane material. The hydroxyl terminated polyol preferably comprises a substantially linear hydroxyl terminated polyol and may include one or more polyester polyols or one or more polyether polyols or a mixture of such polyols. We prefer to use substantially linear hydroxyl terminated polyester polyols having a molecular weight in the range of 500 to 6000. Particularly useful substantially linear hydroxyl terminated polyester polyols are those having an acid value between 0 and 4 (mg. KOH per gm.) and a molecular weight between 1800 and 4000 (i.e. a hydroxyl value of between about 60 and about 28) which correspond to the reaction products of one or more dicarboxylic acids and one or more α,w diols or to polyester polyols from lactones such as those from reaction of epsilon caprolactone with polyfunctional initiators having reactive hydrogen atoms. Suitable dicarboxylic acids include the cyclic dicarboxylic acids including the alicyclic dicarboxylic acids such as hexahydroorthophthalic acid and hexahydroterephthalic acid and acyclic dicarboxylic acids such as those of the general formula $HOOC(CH_2)_nCOOH$ (where $n$ is an integer from 2 to 8) as exemplified by adipic, azelaic and sebacic acids. Suitable α,w diols include the lower aliphatic diols comprising a chain having not more than six carbon atoms which may have substituents such as oxygen in the chain or substituents such as methyl or ethyl groups on the chain, for example, 1,4-butane diol, 1,6-hexane diol, diethylene glycol and 2-ethyl hexane diol-1,6. Preferred polyesters of this type are polyhexamethylene adipates and polytetramethylene adipates having a hydroxyl value of between 38 and 42 (i.e. a molecular weight between 2960 and 2670) and an acid value between 0 and 1, which have a waxy consistency and have a softening point (Ring and Ball) of between about 50° C. and about 70° C.

Other particularly useful substantially linear hydroxyl terminated polyester polyols comprise mixtures of polyesters a first one of which corresponds to the esterification product of entirely acyclic components and a second one of which corresponds to the esterification product of components at least one of which is alicyclic. In such mixtures the first polyester is preferably a hydroxyl terminated polyester material having an acid value between 0 and 5, and a molecular weight between 1800 and 6000 (i.e. a hydroxyl value of between about 63 and about 18) which corresponds to the reaction product of one or more of the aliphatic dicarboxylic acids and one or more of the α,w diols referred to above. Suitable dicarboxylic acids include those of the general formula $HOOC(CH_2)_nCOOH$ (where $n$ is an integer from 2 to 8) as exemplified by adipic, azelaic and sebacic acids. Suitable α,w diols include the lower aliphatic diols comprising a chain having not more than six carbon atoms which may have substituents such as oxygen in the chain or substituents such as methyl or ethyl groups on the chain; for example, 1,4-butane diol, 1,6-hexane diol, diethylene glycol and 2-ethyl hexane diol-1,6. A preferred first polyester material is a polyhexamethylene adipate or a polytetramethylene adipate which has a molecular weight in the range 2200 to 3300, more preferably a molecular weight of about 2400, which is of a waxy consistency, and which is soluble in warm toluol, and in warm mixtures of toluol and isopropyl alcohol.

In such polyester mixtures the second polyester is preferably a hydroxyl terminated polyester material having an acid value of less than 2 or an alkoxy value of less than 5, and a molecular weight of between about 1800 and about 600 (i.e. a hydroxyl value of between about 63 and about 18) which corresponds to the reaction product of a dicarboxylic acid and an α,w diol or both of which comprises a molecule having an alicyclic ring. Suitable α,w diols are those having a six membered alicyclic ring such as 1,4-cyclohexane diol, and 1,4-cyclohexane dimethanol, and suitable acids are those having a six membered alicyclic ring such as hexahydroortho-phthalic acid, and hexahydroterephthalic acid. If the dicarboxylic acid comprises a molecule having an alicyclic ring, the diol may be a lower aliphatic diol comprising a chain having not more than six carbon atoms which may have substituents such as oxygen in the chain or substituents such as methyl or ethyl groups on the chain, and if the diol comprises a molecule having an alicyclic ring the dicarboxylic acid may be of the general formula $HOOC(CH_2)_nCOOH$ where $n$ is an integer from 2 to 8. It is to be noted that when the acid is hexahydroortho-phthalic acid, heat resistance of the adhesive composition is likely to be lower than when the acid is hexahydroterephthalic acid, and also when the diol is 1,4-cyclohexane diol, it may be difficult to form a good solution of the resultant polyurethane material. Preferably the second polyester material corresponds to a reaction product of 1,4-cyclohexane dimethanol and hexahydroterephthalic acid, has a molecular weight of about 3300 and is soluble in warm toluol, and in warm mixtures of toluol isopropylacetate.

When using a mixture of polyester polyols as just above referred to in order to provide a substantially linear hydroxyl terminated polyester material, the relative quantities of the polyester materials used in the mixture depends on several factors, including the nature of the substrates which it is intended to bond with an adhesive composition comprising the polyurethane material, the components of each of the polyester materials, the molecular weights of each of the polyester materials, and the number of alicyclic rings present. If the alicyclic content of the polyurethane material is too high, bonds formed using the adhesive composition tend to show comparatively lower "creep" resistance, while if the alicyclic content of the polyurethane material is too low, bonds formed using the adhesive composition are likely to have comparatively low bond strengths. As a general guide, bonds that are satisfactory in creep resistance and bond strentgh for many purposes may be obtained if there are used; in the case where one only of the components of the second polyester material comprises a molecule having an alicyclic rnig, in each 100 parts by weight of polyester material between 25 and 50 parts by weight of the second polyester material, or in the case where both of the components of the second polyester material comprise a molecule having an alicyclic ring, in each 100 parts by weight of polyester material between 12½ and 25 parts by weight of the second polyester material.

The polyester polyols used in making the new urethane material may be made by usual procedures using as the acid components the acids themselves or their simple derivatives such as their methyl esters or anhydrides. For example, the acid component and diol may be reacted together in the presence of a suitable catalyst (such as dibutyl tin oxide, or stannous oxalate with lithium acetate) under nitrogen at a temperature of about 210° C. to form a relatively low molecular weight intermediate, water evolved in the reaction being removed by distillation. This intermediate may be heated under reduced pressure until the polyester material is of the required molecular weight.

The polyisocyanate used in making the new polyurethane material consists entirely of organic diisocyanate, although isocyanate terminated polymers or adducts may be used instead of, or in admixture with diisocyanate. The diisocyanate may comprise any of the commonly available diisocyanates for example toluene diisocyanate, hexamethylene diisocyanate and diphenyl methane diisocyanate, or may comprise a diisocyanate having an alicyclic ring in its molecule. We prefer to use 4,4'-diphenyl methane diisocyanate or 1,4-cyclohexane diisocyanate. Preferably the polyisocyanate is used in quantities such that the ratio of reactive isocyanate groups present to reactive hydroxyl groups provided by the polyol and chain extending agent is slightly in excess of 1 to 1, preferably about 1.05 to 1.

When making the new polyurethane materials for use as an adhesive composition in solution, the quantity of chain extending agent employed is governed to a large extent by the desirability that the polyurethane material is thermoplastic, substantially linear material soluble in commonly available solvents suitable for inclusion in adhesive compositions (for example, methyl ethyl ketone, ethyl acetate, and to a lesser extent, toluol), and the desirability that adhesive compositions comprising these polyurethane materials exhibit adequate heat resistance. As a general guide, we have found that as larger quantities of the preferred chain extending agent, dimethylol propionic acid, are used in forming the polyurethane material the ability of the polyurethane material to form good solutions reduces. This effect is dependent upon the molecular weight of the polyol used, the maximum quantity of chain extending agent which can be used in conjunction with a polyol of relatively high molecular weight being smaller than the maximum quantity of chain extending agent which can be used in conjunction with a polyol of relatively low molecular weight. Good metal adhesion is obtained where the chain extender has as little as 1% by weight based on the weight of the polyol of the chain extender diol having carboxyl or carboxyl forming substituents, with the remainder of the chain extender being a nonactive diol such as 1,4 butane diol. With the preferred polyols we prefer to use dimethylol propionic acid alone as the chain extending agent and to employ not more than about 5 parts by weight dimethylol propionic acid per 100 parts by weight of the polyol; more preferably, we use about 2 to about 3 parts by weight dimethylol propionic acid per 100 parts by weight of the polyol.

Adhesive compositions comprising polyurethane materials according to the present invention are preferably in the form of solutions which may be applied to a substrate, for example, by use of a brush or a roller, to provide a layer of not more than about 0.3 gm. of adhesive material per square inch of substrate. Solvents used in the solution may comprise those normally used in adhesive. Preferably the polyurethane material is made in solution in an inert solvent such as toluol or isopropyl acetate or a mixture thereof. We prefer to employ toluol as the solvent in which the polyurethane material is made, as it can be obtained commercially in a substantially water free condition and can be used without further drying. We prefer to make the polyurethane material in a single stage, but other methods, such as forming a prepolymer with part of the polyol and the isocyanate, and then reacting the prepolymer with the remainder of the polyol and chain extending agent may be used. We prefer to mix in a reaction vessel the polyol, the chain extending agent catalyst material and solvent (all in a substantially water free condition) and to stir the mixture vigorously at about 80° C. thoroughly to disperse the materials. Usually it is sufficient to stir the mixture for about half an hour. The isocyanate material is then added and stirred into the mixture, and the temperature of the solution is allowed to rise to about 90° C. After stirring at 90° C. for about half an hour the reaction mixture is allowed to cool. As toluene by itself is undesirable as a solvent in adhesive compositions, we prefer to arrange that the quantities of the various materials used in the reaction are such as to give a solution in which after the reaction the total solids present is in the region of about 50% to 70% by weight. It is then possible to add solvent which is more suitable for use in adhesive compositions, for example, methyl ethyl ketone. We prefer to add methyl ethyl ketone to the reaction mixture after it has cooled to a temperature lower than about 60° C. to provide a solution comprising about 18 to 25% by weight total solids and having a viscosity of about 8–10 seconds (10" drop of a $9/16$" diameter steel ball in a 25 mm. internal diameter tube inclined at 80° C. to the horizontal). The resulting solution may be further diluted to a desired viscosity if necessary.

Catalyst materials which may be used to catalyze the polyurethane forming reaction include dibutyl tin dilaurate, triethylene diamine, stannous octoate and triphenyl phosphine oxide. These materials may be used alone or in conjunction with other materials: we prefer to use a mixture of dibutyl tin dilaurate and triethylene diamine.

The adhesive composition may comprise polyurethane material formed by employing relatively small quantities of other materials in addition to those already mentioned so as to provide the polyurethane material with desirable additional properties. Also, the adhesive composition as set forth in the last preceding paragraph may comprise additional materials, for example, fillers, resins and colorants to provide the composition with a desirable blend of properties.

The adhesive composition may comprise polyurethane material formed by employing relatively small quantities of other materials in addition to those already mentioned so as to provide the polyurethane material with desirable additional properties. Also, the adhesive composition as set forth in the last preceding paragraph may comprise additional materials, for example, fillers, resin and colorants to provide the composition with a desirable blend of properties.

The following examples of polyurethane materials and adhesive compositions comprising these materials are given to aid in understanding the invention. It is to be understood that the invention is not restricted to the particular materials, proportions, or procedures given in the examples.

Six illustrative adhesive compositions designated A, C, E, G, I and J were prepared using six illustrative polyurethane materials formed from components specified in Table I. For purposes of comparison, four adhesive compositions designated B, D, F and H in the table were prepared using polyurethane materials which are generally similar to the illustrative polyurethane materials except that 1,4-butane diol was used as the chain extending agent.

Each of the adhesive compositions comprises a 25% solids solution of polyurethane materials in solvent comprising toluol and methyl ethyl ketone in a ratio by weight of 1:2.

Each of the polyester polyols used in forming the polyurethane materials was made by reacting the methyl ester of the appropriate dicarboxylic acid with the appropriate diol under nitrogen in a vessel containing dibutyl tin oxide. Methyl alcohol evolved during the reaction was removed by a distillation process, and the reaction mixture heated under reduced pressure until the polyester had the desired acid and hydroxyl values as shown in Table I.

The polyesters so formed were waxy or glassy solids at room temperature, and these were stored in a dry condition until required for the next stage in the method. In this next stage the polyol component was dissolved in warm toluol in a kettle. The toluol used was a commercially available product and required no treatment to remove water. The mixture was stirred vigorously at a temperature in the region of about 80° C. for a period of about half an hour, the chain extending agent, 0.1% of each of triethylene diamine and dibutyl tin dilaurate (based on the total weight of the polyesters) being stirred into the mixture at an early stage, and stirring being continued until the various materials were well dispersed in the toluol. The quantities of the various materials used are shown in Tables I and II. A commercial diisocyanate material was used comprising not less than 99% diphenyl methane diisocyanate, of which 90% or more is 4,4'-diphenyl methane diisocyanate. This material is solid at room temperature and pressure and was allowed to stand for several hours at a temperature of about 50° C. so that it could be used in liquid condition. As the diisocyanate was added, the mixture was stirred vigorously and the temperature of the reaction mixture was allowed to rise under the influence of the exothermic reaction, to about 90° C. Stirring was continued and the temperature kept at about 90° C. for about half an hour after addition of the diisocyanate. The product of this chemical reaction in toluol was substantially linear thermoplastic polyurethane material which at the reaction temperature remained dissolved in the toluol.

The solution thus obtained, which comprised about 50% total solids, was allowed to cool, and when its temperature was below 60° C. methyl ethyl ketone was added to dilute the solution to 25% total solids. The eventual solvent mixture comprised toluol and methyl ethyl ketone in the ratio of 1:2 by weight, the viscosity of the solution (8 to 10 seconds for a 10" drop of a $9/16$" diameter falling steel ball in a 25 mm. internal diameter tube inclined at an angle of 80° to the horizontal) being such that the solution could be applied by a brush or roller to a substrate to provide a film of the urethane polymer material on the substrate comprising about 0.1 to 0.2 gm. polymer material per square inch of substrate.

Each of the adhesive compositions so formed was used to form sets of sample bonds between various substrates as shown in Table II. Backed PVC means a fabric backed plasticized polyvinyl chloride material, the aluminum used was 26 gauge, the car body steel was 20 gauge low carbon steel and the canvas used was cotton duck. The sample bonds were made up using one inch wide samples of the substrates which were wiped clean before a layer of the appropriate adhesive composition was applied to each by brush.

With some of the sample bonds (each of those marked H.A. in Table III) after the adhesive composition had been brushed onto the substrates, the composition was allowed to dry at room temperature, leaving a clear film on each substrate comprising about 0.1 to 0.2 gm. per square inch of the polyurethane material. After the film had dried the two substrates of each sample bond were positioned in an infra-red heater and the films heated to about 90° C. to activate the films and then the substrates were pressed together in a press.

With others of the sample bonds (each of those marked W.S. in Table III) after the adhesive composition had been brushed onto the substrates and before all the solvent had evaporated from the composition the substrates were pressed together to form the sample bonds.

Each of the sample bonds so formed was stored for one week at room temperature and then subjected to a peel test to examine the strength of the bond. In this test the force in pounds required to separate the bond at a rate of 10 inches per minute was recorded. The results obtained are shown in Table III.

In the following tables:

DMPA means dimethylol propionic acid;
B.D. means 1,4-butane diol; and
MDI means 4,4'-diphenyl methane diisocyanate

TABLE I

| Adhesive composition | Chain extending agent | Polyisocyanate material | Polyol material |
|---|---|---|---|
| A | DMPA | MDI | Butane diol adipate (acid value 1.2, hydroxyl value 41.9). |
| B | B.D. | MDI | Butane diol adipate (acid value 1.2, hydroxyl value 41.9). |
| C | DMPA | MDI | 3 to 1 by weight ratio mixture hexane diol adipate.[1] |
| D | B.D. | MDI | Do.[1] |
| E | DMPA | MDI | Propylene glycol isophthalate (acid value 0.8, hydroxyl value 58.7). |
| F | B.D. | MDI | Do. |
| G | DMPA | MDI | Butane diol adipate (acid value 0.4, hydroxyl value 39.5). |
| H | B.D. | MDI | Butane diol adipate (acid value 1.3, hydroxyl value 43.1). |
| I | [2] | MDI | Do. |
| J | [3] | MDI | Do. |

[1] (Acid value 0.7 hydroxyl value 50.7) and cyclohexanedimethanol hexahydroterephthalate (methoxy value 3.1 hydroxyl value 34.0).
[2] BD and DMPA in ratio of 3:1.
[3] BD and DMPA in ratio of 1:1.

TABLE II

| Adhesive composition | Ratio of reactive OH groups to reactive NCO groups | Combined OH value of polyol and chain extending agent |
|---|---|---|
| A | 1.00–1.05 | 70 |
| B | 1.00–1.05 | 70 |
| C | 1.00–1.05 | 75 |
| D | 1.00–1.05 | 75 |
| E | 1.00–1.05 | 82 |
| F | 1.00–1.05 | 82 |
| G | 1.00–1.05 | 70 |
| H | 1.00–1.05 | 70 |
| I | 1.00–1.05 | 70 |
| J | 1.00–1.05 | 70 |

TABLE III

[Bond strength after 1 week age given in pounds]

| Adhesive composition | Patina/ aluminum H.A. | Backed PVC/ aluminum W.S. | Canvas/ aluminum W.S. | Car body steel/ canvas | Car body steel/ backed PVC | Stainless steel/ canvas |
|---|---|---|---|---|---|---|
| A | 26 | 10 | 23 | | | |
| B | 5 | 3 | 4 | | | |
| C | 40 | 45 | 35 | | | |
| D | 20 | 15 | 10 | | | |
| E | | 20 | 14 | | | |
| F | | 5 | 4 | | | |
| G | 16 | 20 | 30 | 55 | 15 | 20 |
| H | | | 1 | | | |
| I | | | 16 | | | |
| J | | | 25 | | | |

Having thus described our invention what we claim as new and desire to secure by Letters Patent of the United States is:

1. The organic solvent soluble linear polyurethane capable of bonding strongly to metallic surfaces formed by reaction and condensation of a linear hydroxyl terminated polyester polyol having a molecular weight between about 1800 and about 6000 and an acid value between 0 and 4, an organic polyisocyanate, and a chain extender including a short chain linear aliphatic diol having the formula

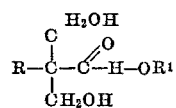

where R is a methyl or ethyl group and $R^1$ is hydrogen or an alcohol residue, and said organic polyisocyanate being employed in amount slightly in excess of that amount required to provide one —NCO group for each OH group present in said polyol and said chain extender diol.

2. The polyurethane as defined in claim 1 in which said chain extender comprises a linear aliphatic diol having a carbon to carbon chain or from 3 to 7 carbon atoms.

3. The polyurethane as defined in claim 2 in which said chain extender comprises dimethylol propionic acid in amount of from about 1% to about 5% by weight based on the weight of said polyol.

4. The polyurethane as defined in claim 2 in which said chain extender comprises a mixture of a linear aliphatic diol having a carbon to carbon chain of from 3 to 7 carbon atoms and being free from other reactive groups and from about 1% to about 5% by weight of dimethylol propionic acid based on the weight of said polyol.

5. The polyurethane as defined in claim 3 in which said polyol is a mixture of a first hydroxy terminated polyester from reaction and condensation of acyclic components and having a molecular weight between about 1800 and about 6000 and an acid value of less than 2 and a second hydroxyl terminated polyester from reaction and condensation of a dicarboxylic acid and a diol at least one of which is alicyclic, said second polyester having a molecular weight between about 1800 and about 6000 and an acid value of less than about 2, and acid in amount of from about 1% to about 5% by weight based on the combined weight of said first and second polyesters.

6. The polyurethane as defined in claim 5 in which said second polyester constitutes from about 25% to about 50% of the combined weight of the first and second polyesters and in which only one of the dicarboxylic acid and diol reacted to form said second polyester has an alicyclic ring.

7. The polyurethane as defined in claim 5 in which said second polyester constitues from about 12.5% to about 25% of the combined weight of the first and second polyesters and where both the dicarboxylic acid and the diol reacted to form said second polyester have alicyclic rings.

8. An adhesive for bonding strongly to metallic surfaces, said adhesive comprising a volatile organic solvent solution of a linear polyurethane from reaction and condensation of a linear hydroxyl terminated polyester polyol having a molecular weight between about 1800 and about 6000 and an acid value between 0 and 4, an organic polyisocyanate and a chain extender including a short chain linear aliphatic diol having the formula

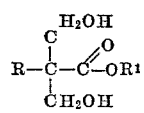

where R is a methyl or ethyl group and $R^1$ is hydrogen or an alcohol residue, and said organic polyisocyanate being employed in amount slightly in excess of that amount required to provide one —NCO group for each OH group present in said polyol and said chain extender diol.

9. An adhesive as defined in claim 8 in which said chain extender comprises a linear aliphatic diol having a carbon to carbon chain of from 3 to 7 carbon atoms.

10. An adhesive as defined in claim 9 in which said chain extender comprises dimethylol propionic acid in amount of from about 1% to about 5% by weight based on the weight of said polyol.

11. An adhesive as defined in claim 9 in which said chain extender comprises a mixture of a linear aliphatic diol having a carbon to carbon chain of from 3 to 7 carbon atoms and being free from other reactive groups and from about 1% to about 5% by weight of dimethylol propionic acid based on the weight of said polyol.

12. An adhesive as defined in claim 10 in which said polyol is a mixture of a first hydroxy terminated polyester from reaction and condensation of acyclic components and having a molecular weight between about 1800 and about 6000 and an acid value of less than 2 and a second hydroxyl terminated polyester from reaction and condensation of a dicarboxylic acid and a diol at least one of which is alicyclic, said second polyester having a molecular weight between about 1800 and about 6000 and an acid value of less than about 2, and said chain extender comprises dimethylol propionic acid in amount of from about 1% to about 5% by weight based on the combined weights of said first and second polyesters.

13. An adhesive as defined in claim 12 in which said second polyester constitutes from about 25% to about 50% of the combined weight of the first and second polyesters and in which only one of the dicarboxylic acid and diol reacted to form said second polyester has an alicyclic ring.

14. An adhesive as defined in claim 12 in which said second polyester constitutes from about 12.5% to about 25% of the combined weight of the first and second polyesters and where both the dicarboxylic acid and the diol reacted to form said second polyester have alicyclic rings.

References Cited

UNITED STATES PATENTS

| | | | |
|---|---|---|---|
| 3,491,066 | 1/1970 | Petropoules | 260—75 R |
| 3,409,855 | 3/1970 | Roper | 260—29.2 U |
| 3,012,987 | 12/1961 | Ansul | 260—858 |
| 3,284,539 | 11/1966 | McElroy | 260—858 |
| 3,412,054 | 11/1968 | Milligan | 260—18 TN |
| 3,496,144 | 2/1970 | Kundle | 260—77.5 SP |

FOREIGN PATENTS

| | | | |
|---|---|---|---|
| 1,478,990 | 4/1967 | France | 260—75 TNP |
| 1,055,229 | 4/1959 | Germany | 260—75 TNP |

PAUL LIEBERMAN, Primary Examiner

U.S. Cl. X.R.

161—190; 260—75 NH, 75 NP, 77.5 AM, 860

PO-1050
(5/69)

UNITED STATES PATENT OFFICE
CERTIFICATE OF CORRECTION

Patent No. 3,658,939          Dated April 25, 1972

Inventor(s) Austin T. Carpenter, Roy Garrington and Keith W. Hartion

It is certified that error appears in the above-identified patent and that said Letters Patent are hereby corrected as shown below:

Claim 5 - Line skipped between lines 39 and 40 should read -said chain extender comprising dimethylol propionic- Signed and sealed this 25th day of July 1972.

(SEAL)
Attest:

EDWARD M. FLETCHER, JR.
Attesting Officer

ROBERT GOTTSCHALK
Commissioner of Patents